United States Patent [19]

Hagy et al.

[11] Patent Number: 4,775,579
[45] Date of Patent: Oct. 4, 1988

[54] HYDROENTANGLED ELASTIC AND NONELASTIC FILAMENTS

[75] Inventors: M. Dexter Hagy, Greenville; Jared A. Austin, Greer, both of S.C.

[73] Assignee: James River Corporation of Virginia, Richmond, Va.

[21] Appl. No.: 117,234

[22] Filed: Nov. 5, 1987

[51] Int. Cl.⁴ .............................................. B32B 5/06
[52] U.S. Cl. ...................................... 428/284; 28/104; 428/137; 428/219; 428/299; 428/903
[58] Field of Search ................... 28/104; 428/903, 299, 428/284, 137, 219

[56] References Cited

U.S. PATENT DOCUMENTS

| | | | |
|---|---|---|---|
| 3,917,785 | 11/1975 | Kalwartes | 28/104 |
| 4,145,468 | 3/1979 | Mizoguchi et al. | 28/104 |
| 4,146,663 | 3/1979 | Ikeda et al. | 28/104 |
| 4,296,163 | 10/1981 | Emi et al. | 428/297 |
| 4,442,161 | 4/1984 | Kirayoglu et al. | 28/104 |

*Primary Examiner*—James J. Bell
*Attorney, Agent, or Firm*—William A. Aguele; Richard J. Gallagher; Thomas H. Whaley

[57] ABSTRACT

An elastic nonwoven fabric is made up of staple textile fibers or wood pulp, or both hydroentangled with an elastic web or net of a thermoplastic elastic polymer.

12 Claims, 1 Drawing Sheet

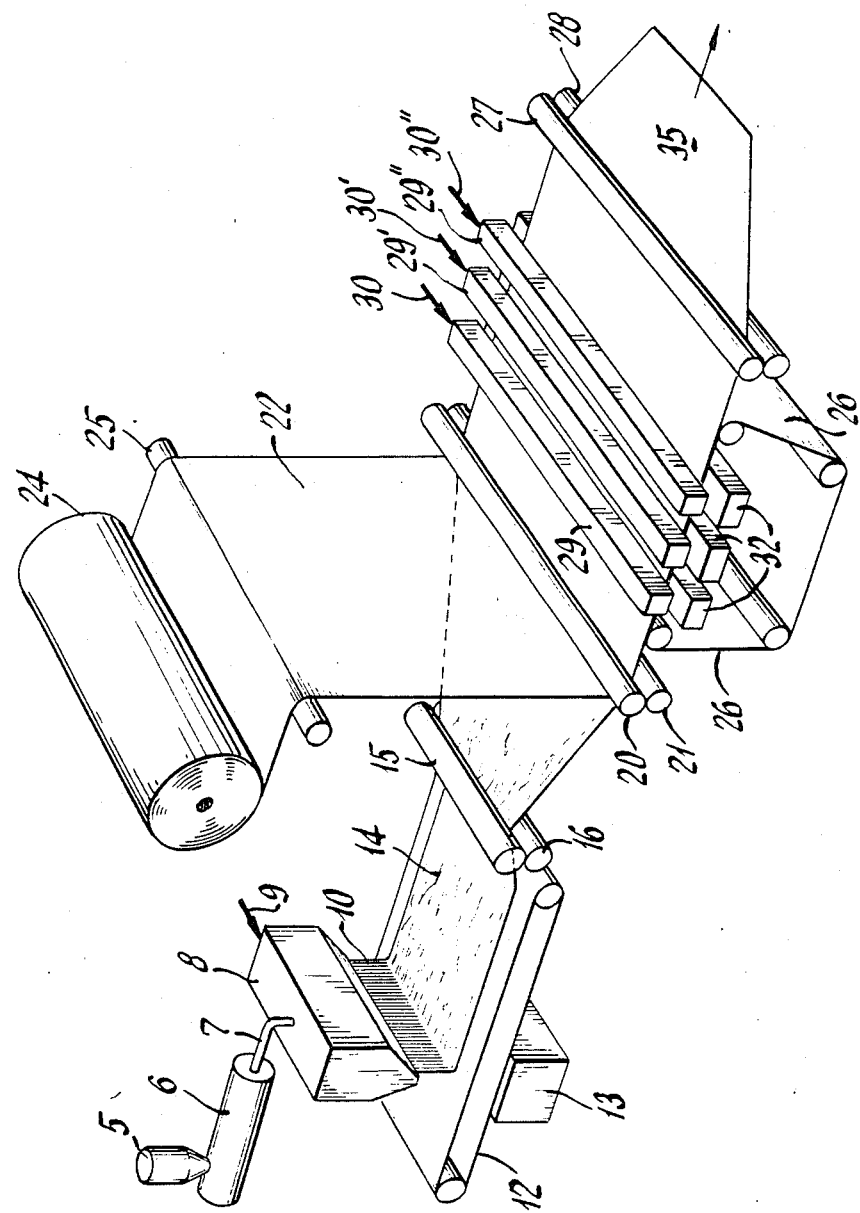

HYDROENTANGLED ELASTIC AND NONELASTIC FILAMENTS

This invention relates to an elastic nonwoven fabric containing staple textile fibers intimately entangled with an elastic web or net. In one of its more specific aspects, wood pulp and staple length textile fibers are hydraulically entangled with a meltblown elastic web to form an absorbent elastic nonwoven fabric. In another, more specific embodiment, an elastic nonwoven fabric having a soft, absorbent exterior surface suitable for use as a surgical bandage is produced by placing a wet laid absorbent web comprising staple textile fibers on at least one surface of a continuous filament meltblown elastic fiber web, and subjecting the composite to the action of high velocity fluid jets intimately entangling the fibers with one another. In still another specific embodiment, an elastic melt blown continuous filament web is stretched in at least one direction prior to entanglement with a preformed web of wood pulp and absorbent staple length fibers. In another embodiment, an elastic fabric is prepared by hydraulically entangling a web of staple textile fibers with the fibrous strands of an elastic net prepared by a split film technique.

Stretchable fabrics are desirable for use as bandages and supportive clothing because of their ability to conform to irregular shapes and to allow more freedom of body movements than do fabrics with limited extensibility. Historically, it has been difficult to engineer stretch characteristics into traditional textile structures. Limited amounts of stretch were developed in loose knit constructions and in creped fabrics.

With the introduction of spandex fibers, fabrics with high extensibility could be produced by conventional textile constructions. The cost of the spandex fibers and the relatively slow manufacturing speeds employed in weaving and knitting have made spandex textile products relatively expensive as compared with nonelastic knit and woven textile products.

Attempts have been made to develop lower cost elastic fabrics which would be suitable for disposable applications. In U.S. Pat. No. 3,485,706, a non-woven fabric is produced by hydroentangling staple fibers with a 70 denier spandex yarn which is stretched about 200 percent and held in tension during the hydroentanglement treatment. It is stated that a two way stretch patterned non-woven fabric may be produced by tensioning elastic filaments and/or yarns in a cross-warp arrangement, placing a layer of surfacing fibers on one or both sides of the cross-warp, placing the composite over a patterning member and treating with high pressure columnar jets of liquid. Nonwoven fabrics with bias stretch properties are disclosed in U.S. Pat. No. 3,531,363 wherein at least three warp-like arrays of yarns or filaments are arranged to form layers, the strands of which preferably intersect at a 90° angle intertangled by fine streams of liquid jetted at high pressure.

In U.S. Pat. No. 4,426,420, a spunlaced fabric containing elastic staple length fibers blended with conventional staple hard fibers is formed by subjecting a batt of the fibers to hydroentanglement followed by heat treatment to develop elastic characteristics in the elastomeric fibers. The elasticity of fabrics so produced is necessarily rather limited.

The hydroentanglement process is well known in the art, as are various composite fabrics produced by such processes. Hydraulic entanglement methods and apparatus are disclosed, for example, in U.S. Pat. No. 3,485,706, incorporated herein by reference. Such methods involve impingement of small diameter, high velocity jets of liquid onto a fibrous web or mat supported on either a flat surface or a foraminous screen. The resulting fabric may be apertured or non-apertured, patterned or unpatterned, depending upon the nature of the support surface and the pattern of the liquid jet streams as known in the art. Fabrics so produced are referred to in the art as spunlaced fabrics.

In accordance with our invention, an elastic nonwoven fabric, e.g. a fabric suitable for use as an elastic bandage, support, or the like, is prepared from a composite of fibers comprising an elastic web or net hydroentangled with absorbent, textile fibers or wood pulp, or a mixture of textile fibers and wood pulp. Fabrics as disclosed herein may be produced at relatively low costs as compared with the costs of producing elastic fabrics requiring elastic yarns, such as spandex yarns. U.S. Pat. No. 4,323,534, incorporated herein by reference, discloses a suitable method for the production of an elastic web by meltblowing of elastomeric polymers. Such elastic webs are suitable as the elastic web component of the products of our invention. U.S. Pat. No. 4,636,419, incorporated herein for reference, discloses a method for preparing an elastic net suitable for the elastic component. In preparing this net, thermoplastic elastomers can be used as one or more of the components of the multiple component extruded film.

Polymers useful for the production of elastic filaments and films by conventional, hot melt extrusion techniques may be selected from a multitude of known thermoplastic elastomers. Those which have been found suitable for producing continuous filament elastic webs and nets include the group consisting of ethylene-polybutylene copolymers; poly(ethylene-butylene) polystyrene block copolymers; polyadipate esters; polyurethanes; polyester elastomeric polymers; and polyamide elastomeric polymers.

Commercially available polymers suitable for the production of elastic nets and webs include poly(ethylene-butylene)polystyrene block copolymers sold under the trade names Kraton G-1657 and Kraton G-1652 by Shell Chemical Company, Houston, Tex.; polyadipate esters sold under the trade names Pellethane 2355-95 AE and Pellethane 2355-55 DE by Dow Chemical Company, Midland, Mich.; and polyurethanes sold under the trade names Estane 58277I and 58277II, and Estane 58810 by B. F. Goodrich Co., Akron, Ohio.

Nonelastic fibers suitable for use in the manufacture of nonwoven absorbent elastic fabrics of this invention include various textile fibers, preferably cotton; reconstituted cellulose fibers, e.g., rayon, cellulose acetate; polyolefins, polyamides, polyesters, acrylic and modacrylic fibers; and wool. Suitable commercially available staple fibers include rayon staple sold under the trade name T-8171 by BASF Corporation, Wyandotte, Mich.; and polyester staples sold under the trade name T-54 Dacron by E.I. DuPont de Nemours and Company, Wilmington, Del.; and under the trade name T-400 Fortrel by Celanese Corporation, New York, N.Y.

Wood pulp may be included in the composite elastic fabric, preferably by incorporating the wood fiber in a water laid web or an air laid web containing the staple textile fibers. In one embodiment of the method for combining the various fibers into the finished composite web, the pulp and staple textile fibers are formed into an essentially nonelastic water laid web, the nonelastic web is laid on, or under, the elastic web, and the fibers are intertangled by hydraulic jets to form an elastic spunlaced composite nonwoven fabric.

The nonelastic web may be produced by a conventional dry or wet papermaking method. Any one of the various, commonly practiced dispersant techniques may be used to disperse a uniform furnish of wood pulp fibers and staple fibers onto a foraminous screen of a conventional papermaking machine. U.S. Pat. No. 4,081,319 to Conway and U.S. Pat. No. 4,200,488 to Brandon et al. disclose wet-laying methods which may be used to produce a uniform web of wood pulp and staple fibers. A preferred method of dispersing a mixture of staple fibers and wood pulp in an aqueous furnish is disclosed in commonly assigned copending U.S. patent application Ser. No. 035,059, filed Apr. 6, 1987. A suitable method for producing a dry laid web is disclosed in U.S. Pat. No. 4,193,751.

While various wood pulps may be incorporated into the finished fabric by hydroentanglement as disclosed herein, those pulps which are characterized by long, flexible fibers of a low coarseness index are preferred. Wood fibers with an average fiber length of three to five millimeters are especially suited for use in the elastic fabrics. Western red cedar, redwood and northern softwood kraft pulps, for example, are among the more desirable wood pulps useful in the nonwoven elastic fabrics.

The wood pulp content of the nonelastic web may range from none to about 100 weight percent. For most applications, a wood pulp content in the range of from about 55 weight percent to about 75 weight percent is preferred. The higher levels of wood pulp increase the bulk and absorbency of the product usually accompanied by some loss of abrasion resistance.

The novel composite web formed by the method of this invention exhibits characteristics similar to those of knit textile cloth and processes combination of softness and extensibility superior to those exhibited by any other nonwoven fabric. In particular, the fabric of this invention does not have the "rubbery feel" of webs and nets prepared from elastomeric polymers.

In accordance with the present invention, a method is provided for forming an elastic nonwoven fabric comprising hydroentangled elastic and nonelastic components. A web or net of elastomeric polymers is hydroentangled with one or more webs of nonelastic fibers on either face, or on both faces, of the web or net to form a soft, elastic nonwoven composite fabric useful in many applications including disposable, personal health care items, and stretchable bandages and wound dressings.

Preferably, the lengths of the staple fiber are within the range of from one-quarter inch to two inches. The diameter of the synthetic staple fibers should not be greater than six denier for best results; synthetic fibers of one and one-half denier or less are preferred.

The basis weight of the composite web may vary from about 0.8 ounce per square yard to about eight ounces per square yard. The lower limit generally defines the minimum weight at which acceptable web strength (greater than two pounds per inch strip tensile) can be attained. The upper limit generally defines the weight above which the water jets are not effective to produce a uniformly entangled web.

To attain acceptable levels of elasticity and softness, the elastic component should be at least 15 percent by weight of the composite web, but should not be greater than 80 percent by weight.

The elastic web or net may be supplied from a suitable source in rolls, unwound from a roll, stretched in either the machine direction (MD) or the cross-machine direction (CD), or in both directions, layered with one or more webs of nonelastic fibers, and hydroentangled. Alternatively, elastic fabric may be produced on-site and fed directly from the manufacturing apparatus to the hydroentangling apparatus. In passing from the manufacturing apparatus to the point of layering with the nonelastic web, it may be stretched in one or both the machine direction and cross-machine direction orientations by the use of tenter frames or spreading rolls.

In the method of our invention, prior to hydroentanglement, a web containing the staple fibers is laid on, or under, the elastic component, or on both sides of the elastic component. The webs are carried on a foraminous screen or belt which is preferably made up of synthetic continuous filaments, e.g., polyethylene terephthalate filaments. The combined webs are transported on the foraminous screen under several water jet manifolds of the type described in U.S. Pat. No. 3,485,706. The water jets entangle the discrete staple fibers and wood fibers present in the nonelastic web with the elastic meltblown filaments or with the fibrous stands of the net producing an intimately blended composite elastic fabric. The stretch tension on the elastic web may be relieved before or after drying the composite web. After drying, the resulting fabric is soft and stretchable, suitable for use in disposable personal care or health care applications, or as a durable, multiple-use fabric.

BRIEF DESCRIPTION OF THE DRAWINGS

One embodiment of a suitable method for making the nonwoven elastic fabric of this invention is illustrated in the FIGURE, which is a simplified, diagrammatic illustration of apparatus capable of carrying out the method of this invention. With reference to the FIGURE, thermoplastic elastomer pellets are placed in the feed hopper 4 of a screw extruder 5, where they are heated to a temperature sufficient to melt the elastomer. The molten polymer is forced by the screw through conduit 7 into a meltblowing die 8. The elevated temperature of the polymer is maintained in die 8 by electric heaters (not illustrated). Attenuating gas is supplied to the die 8 through line 9. Polymer is extruded from the die through a plurality of samll diameter capillaries, for example, capillaries having a diameter of about 0.015 inch, at a density of 30 capillaries per inch exit from the die tip as filaments of molten polymer 10.

Heated, pressurized attenuating gas is discharged from the die tip from gas passages (not illustrated) adjacent to the capillaries from which the polymer is extruded as known in the art. The gas-borne filaments 10 are blown onto a foraminous endless belt 12 or a screen covered rotating drum (not shown). Vacuum box 13 assists in the retention of fibers on the belt. The fibers form a coherent web 14 which is removed from the belt by a pair of rolls 15 and 16. Bonding elements (not illustrated) may be provided to ensure the desired extent of bonding of the continuous filaments. Preferably, the bonded area does not exceed 15 percent of the total area of the continuous filament web; bonding in the range of from about 5 to about 10 percent of the area is generally preferred.

The elastic meltblown web from rolls 15 and 16 is fed to rolls 20 and 21 which are operated at a speed greater than the speed of rolls 15 and 16, stretching the elastic web in the machine direction at the same time that it is expanded in the cross-machine direction. A preformed nonelastic web 22 comprising staple fibers and wood pulp fibers is drawn from supply roll 24 over feed roll 25 and laid on top of the web at rolls 20 and 21. The two layers of preformed webs, i.e., an elastic, continuous filament web 14 and a substantially nonelastic web 22, are carried on a foraminous carrier belt 26 formed of a flexible material, such as a woven polyester screen. The carrier belt is supported on rolls, one or more of which may be driven by means not illustrated. A pair of pinch rolls 27 and 28 maintain the elastic web under tension as it passes from rolls 20 and 21 to rolls 27 and 28 supported on belt 26.

Several orifice manifolds 29 are positioned above the belt to discharge small diameter, high velocity jet streams of water onto the webs 22 and 14 as they move from rolls 20 and 21 to rolls 27 and 28 on belt 26. Each of the manifolds 29, 29' and 29'' is connected with a source of water under pressure through conduits 30, 30' and 30'', and each is provided with one or more rows of 0.005 inch diameter orifices spaced on 0.025 inch centers (40 orifices per inch). The spacing between the orifice outlets of the manifolds and the web directly beneath each manifold is preferably in the range of from about one-quarter inch to about three-quarters inch. Water from jets issuing from the orifices and passing through the webs 22, 14 and the screen 25 is removed by vacuum boxes 32. Although only three manifolds are illustrated, there is no limit to the number of manifolds which may be used, the first two operating at a manifold pressure of about 200 psig and the remainder at 600 psig to 1600 psig or higher.

Drying of the hydroentangled fabric 35 may take place either before or after releasing the tension on the elastic web.

EXAMPLE

A rectangular segment of elastic meltblown polyurethane web having a basis weight of one ounce per square yard is stretched to 200 percent of its original length in the machine direction (MD) and to 150 percent of its original width in the cross-machine direction (CD) using spreading rolls as known in the art. The stretched web is placed on top of a 40 mesh screen woven from polyethylene terephthalate continuous filaments. A preformed, wet laid web of 30 weight percent polyester staple fibers of 1.5 denier by one-half inch and 70 weight percent northern softwood pulp is placed on top of the stretched elastic web. In this example, the polyester fibers are 1.5 denier and three-quarters inch in length with a basis weight of one ounce per square yard. The fibers from the two webs are hydroentangled with one another using a single manifold with a single row of 0.005 inch diameter orifices spaced 40 per inch along a 40-inch strip. In this example, layered webs are passed beneath the water jet manifold eight times at a speed of 240 feet per minute. The first two passes are made at a manifold water pressure of 200 psig. The manifold water pressure is increased during the remaining six passes made at 800 psig. After drying, the fabric has a soft texture on both faces and may be stretched to conform to various shapes.

We claim:

1. A nonwoven elastic fabric having a basis weight in the range of 0.8 to 8 ounces per square yard comprising 15 to 80 weight percent of an elastic synthetic polymer web or net and 20 to 85 weight percent absorbent staple fibers hydraulically entangled in the elastic polymer web.

2. A nonwoven elastic fabric comprising 15 to 80 weight percent elastic polymer web or net entangled with 20 to 85 weight percent of water laid fibers comprising wood pulp and staple length textile fibers.

3. A nonwoven elastic fabric according to claim 1 wherein said elastic polymer is selected from the group consisting of ethylene-polybutylene copolymers, poly-(ethylene-butylene) polystyrene block copolymers, polyadipate esters, polyurethanes, polyester elastomeric polymers, and polyamide elastic polymers.

4. A nonwoven elastic fabric comprising an elastic polymer web or net containing from about 20 to about 85 weight percent of paper pulp and staple textile fibers wherein the relative proportions of pulp to staple length fibers is within the range of 55 to 75 weight percent pulp and 25 to 45 weight percent staple length fibers.

5. A nonwoven fabric according to claim 4 wherein the staple length fibers have a diameter within the range of one to three denier and a length in the range of one quarter inch to 2 inches.

6. A nonwoven fabric according to claim 4 wherein the weight of the elastic web is in the range of 0.5 to 6 ounces per square yard.

7. A nonwoven fabric according to claim 4 wherein the elastic polymer is a polyurethane polyester block copolymer.

8. A nonwoven fabric according to claim 4 wherein the fibrous components of the elastic web are bonded, the bonded area being in the range of from about 5 to 15 percent of the total area of the web.

9. A nonwoven fabric according to claim 5 wherein the staple length fibers are reconstituted cellulose fibers.

10. A method of producing a nonwoven elastic fabric which comprises forming a web or net of elastic polymer fibers, forming a nonelastic web of staple length textile fibers and wood pulp, laying the webs into contact with one another and hydroentangling the fibers of the nonelastic web and the web or net to form an elastic fabric.

11. A method according to claim 10 wherein the fibers of the nonelastic web comprise 20 to 85 weight percent of the elastic fabric.

12. A method according to claim 10 wherein said elastic web is stretched within its elastic limits.

* * * * *

UNITED STATES PATENT AND TRADEMARK OFFICE
CERTIFICATE OF CORRECTION

PATENT NO. : 4,775,579

DATED : October 4, 1988

INVENTOR(S) : M. Dexter Hagy and Jared A. Austin

It is certified that error appears in the above-identified patent and that said Letters Patent is hereby corrected as shown below:

Col. 6, line 59 (Claim 12, line 2), after "elastic limits" please insert --prior to hydroentanglement--.

Signed and Sealed this

Seventh Day of March, 1989

*Attest:*

DONALD J. QUIGG

*Attesting Officer*    *Commissioner of Patents and Trademarks*